(12) United States Patent
Kim et al.

(10) Patent No.: US 12,247,340 B2
(45) Date of Patent: Mar. 11, 2025

(54) LAUNDRY PROCESSING APPARATUS

(71) Applicant: LG ELECTRONICS INC., Seoul (KR)

(72) Inventors: Myungsang Kim, Seoul (KR); Baekeun Kwon, Seoul (KR); Dongwoon Kim, Seoul (KR); Yoosool Yoon, Seoul (KR); Cheolyeon Lee, Seoul (KR); Hoyong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 805 days.

(21) Appl. No.: 17/423,725

(22) PCT Filed: Apr. 5, 2019

(86) PCT No.: PCT/KR2019/004054
§ 371 (c)(1),
(2) Date: Jul. 16, 2021

(87) PCT Pub. No.: WO2020/149458
PCT Pub. Date: Jul. 23, 2020

(65) Prior Publication Data
US 2022/0064839 A1     Mar. 3, 2022

(30) Foreign Application Priority Data
Jan. 16, 2019    (KR) ........................ 10-2019-0005718

(51) Int. Cl.
*D06F 34/10*     (2020.01)
*D06F 34/05*     (2020.01)
*D06F 103/08*     (2020.01)
(Continued)

(52) U.S. Cl.
CPC .............. *D06F 34/10* (2020.02); *D06F 34/05* (2020.02); *H02J 50/10* (2016.02); *D06F 2103/08* (2020.02); *D06F 2105/12* (2020.02)

(58) Field of Classification Search
CPC ...... D06F 34/10; D06F 34/05; D06F 2103/08; D06F 2105/12; D06F 58/04; D06F 34/18;
(Continued)

(56) References Cited

U.S. PATENT DOCUMENTS 6,535,135 B1    3/2003    French et al.
9,951,465 B1    4/2018    Herschler et al.
(Continued)

FOREIGN PATENT DOCUMENTS

CN        100344974 C     10/2007
DE   10 2016 216 265     3/2018
(Continued)

OTHER PUBLICATIONS

Translation, KR-20050108785-A (Year: 2005).*
(Continued)

*Primary Examiner* — Jessica Yuen
(74) *Attorney, Agent, or Firm* — KED & Associates LLP (57) ABSTRACT

A laundry processing apparatus according to an embodiment of the present disclosure includes a drum rotatably disposed in a main body, a drive motor configured to provide rotational power to the drum, a lifter mounted on an inner circumferential surface of the drum, a dryness level sensing device provided in the lifter, a wireless power receiver electrically connected to the dryness level sensing device and provided in the lifter, a wireless power transmitter disposed between the main body and the drum to correspond to the wireless power receiver, and a controller configured to receive a sensing result from the dryness level sensing device and calculate a dryness level based on the received sensing result.

18 Claims, 6 Drawing Sheets

(51) Int. Cl.
*D06F 105/12* (2020.01)
*H02J 50/10* (2016.01)

(58) Field of Classification Search
CPC .. D06F 58/02; D06F 2103/10; D06F 2103/38; D06F 2105/46; D06F 2105/56; H02J 50/10
See application file for complete search history.

(56) References Cited

U.S. PATENT DOCUMENTS

| | | | |
|---|---|---|---|
| 2009/0025250 A1* | 1/2009 | Koo | D06F 34/18 34/565 |
| 2016/0201253 A1* | 7/2016 | Kulkarni | H02J 50/10 307/104 |
| 2016/0330572 A1 | 11/2016 | Kropp et al. | |
| 2017/0344133 A1 | 11/2017 | Kang | |
| 2018/0266030 A1 | 9/2018 | Kwon et al. | |
| 2019/0319489 A1 | 10/2019 | Chiriatti | |

FOREIGN PATENT DOCUMENTS

| | | | |
|---|---|---|---|
| EP | 1 997 951 | 12/2008 | |
| EP | 2604740 A1 * | 6/2013 | ............. D06F 37/26 |
| KR | 10-0499525 B1 | 7/2005 | |
| KR | 20050108785 A * | 11/2005 | |
| KR | 10-2016-0068427 A | 6/2016 | |
| KR | 10-1671003 B1 | 10/2016 | |
| KR | 10-2018-0106474 A | 10/2018 | |
| WO | WO 2018/091717 | 5/2018 | |

OTHER PUBLICATIONS

International Search Report and Written Opinion dated Oct. 11, 2019 issued in Application No. PCT/KR2019/004054 (with English Translation).
European Search Report dated Sep. 9, 2022 issued in EP Application No. 19910151.0.

* cited by examiner

LAUNDRY PROCESSING APPARATUS

CROSS-REFERENCE TO RELATED PATENT APPLICATIONS

This application is a U.S. National Stage Application under 35 U.S.C. § 371 of PCT Application No. PCT/KR2019/004054, filed Apr. 5, 2019, which claims priority to Korean Patent Application No. 10-2019-0005718, filed Jan. 16, 2019, whose entire disclosures are hereby incorporated by reference.

TECHNICAL FIELD

The present disclosure relates to a laundry processing apparatus.

BACKGROUND ART

In general, a laundry processing apparatus having a drying function, such as a washing machine or a dryer, is an apparatus for evaporating moisture from laundry by supplying hot air to wet clothes put thereinto.

For example, the dryer may include a drum that is rotatably disposed in a main body and into which laundry is put; a drive motor which drives the drum; an air blower fan which blows air into the drum; and a heating means which heats air flowing into the drum.

On the other hand, the dryer may be classified into a circulation type dryer and an exhaust type dryer according to a method of discharging hot and humid air. Air coming out from the drum absorbs the moisture of the laundry in the drum and thus becomes high-temperature and high-humidity air. The circulation type dryer cools air below a dew point temperature through a heat exchange means while circulating without discharging hot and humid air to the outside of the dryer, and re-supplies the air after condensing the moisture contained in the hot and humid air. The exhaust type dryer has a method of directly discharging high-temperature and high-humidity air passing through the drum to the outside.

On the other hand, there may be a heater method using high-temperature electrical resistance heat generated by electrical resistance or using combustion heat generated by burning gas as the heating means.

Alternatively, there may be a heat pump system as the heating means. The heat pump system includes a heat exchanger, a compressor, and an expander. After a refrigerant circulating through the system recovers energy of hot air exhausted from a drum, air supplied to the drum is heated, thereby increasing energy efficiency.

On the other hand, a dryness level sensor which senses a dry state (i.e., dryness level) of laundry may be provided in the laundry processing apparatus. For example, when two metal plates are disposed side by side and laundry is placed between the metal plates to form a circuit, the dryness level sensor may sense the dryness level of the laundry by measuring the resistance value of the laundry through a change in voltage.

The dryness level sensor may be provided at a lower end of a door part to indirectly sense the dryness level, but it may be difficult to accurately sense the dryness level.

In order to accurately sense the dryness level, the dryness level sensor has to be implemented in the drum to directly contact the laundry. That is, since the dryness level sensor has to be implemented in the drum, the laundry processing apparatus has to be manufactured to connect the outside and inside of the drum through cables or terminals so as to supply power to the dryness level sensor. However, since the drum is rotated by a drive motor, it may be difficult to connect the outside and inside of the drum through the cables or terminals.

In this regard, Patent Document 1 (Korean Patent Application Publication No. 10-2004-0049186, published on Jun. 11, 2014) discloses a configuration in which an insulating band and a metal band are disposed on an outer circumferential surface of a drum, a brush coming into close contact with the metal band is provided on an inner surface of a main body, and the brush is connected to a power source through an electric wire so that the power is supplied to a dryness level sensor inside the drum.

However, according to Patent Document 1, it is necessary to additionally implement the insulating band, the metal band, and the brush, which may increase the difficulty of the process. In addition, when the dryer is used for a long period of time, the contact force between the brush and the metal band may be reduced due to abrasion of the brush. In this case, power supply to the inside of the drum may not be smooth.

DISCLOSURE

Technical Problem

An object of the present disclosure is to provide a laundry processing apparatus capable of simplifying configurations for supplying power to a dryness level sensor provided in a drum.

Another object of the present disclosure is to provide a laundry processing apparatus capable of more accurately measuring the dryness level of laundry through a dryness level sensor.

Technical Solution

A laundry processing apparatus according to an embodiment of the present disclosure includes a dryness level sensing device and a wireless power receiver in a lifter. A wireless power transmitter is disposed between a main body and a drum corresponding to a wireless power receiver. Therefore, a configuration of a cable or an electric wire for supplying power by wire between the inside and the outside of the drum is unnecessary. Accordingly, the difficulty of the process for connecting the cable or the electric wire can be reduced.

The wireless power receiver may include a receiving coil, and the wireless power transmitter may include a transmitting coil disposed to face the receiving coil.

According to an embodiment, the transmitting coil may be disposed below the drum in the main body. A controller of the laundry processing apparatus calculates the position of the lifter based on the rotation state of the drum. When the calculated position corresponds to the lower portion with respect to the center of the drum, the controller may control the wireless power transmitter to supply power to the wireless power receiver.

According to an embodiment, the controller may rotate the drum by controlling the driving of the drive motor during a drying cycle, calculate a position of the lifter based on a rotation state of the drum, and when the calculated position corresponds to a lower portion with respect to the center of the drum, control the wireless power transmitter to supply power to the wireless power receiver. That is, the controller can minimize power consumption by controlling the power to be transmitted in a positional relationship in which wireless power transmission efficiency is maximized.

According to an embodiment, the controller may control the wireless power transmitter to supply power to the wireless power receiver when a preset time has elapsed from start of a drying stroke, thereby minimizing unnecessary power waste.

The dryness level sensing device may obtain the sensing result based on the power provided from the wireless power receiver, and output the sensing result through a near field communication (NFC) transmitter, and the controller may receive the sensing result through an NFC reader provided in the main body. That is, the communication connection between the controller for transmitting the sensing result and the dryness level sensing device is implemented in a wireless communication method, thereby preventing an increase in process difficulty due to connection of a communication cable or the like.

When the calculated dryness level is equal to or greater than a reference dryness, the controller may detect completion of a drying cycle and stop the driving of the drive motor.

According to an embodiment, when the calculated dryness level is less than a reference dryness level, the controller may control the driving of the drive motor based on the calculated dryness level, thereby performing a more efficient drying cycle.

According to an embodiment, when the calculated dryness level is less than the reference dryness level, the controller may change a power transmission period based on the calculated dryness level, thereby performing a more efficient dryness level sensing operation.

Each of at least one dryness level sensor included in the dryness level sensing device is disposed to be spaced apart from each other so that a portion thereof is exposed through one surface of the lifter, thereby more accurately obtaining the sensing result required for calculating the dryness level through contact with laundry.

Advantageous Effects

In a laundry processing apparatus according to an embodiment of the present disclosure, a dryness level sensing device and a wireless power receiver connected thereto may be disposed in a lifter provided in a drum, and a wireless power transmitter may be disposed at a position corresponding to the wireless power receiver in a space outside the drum. Since the dryness level sensing device can operate by receiving power according to a wireless power transmission method, a configuration of a cable or electric wire for supplying power between the inside and the outside of the drum is unnecessary. Accordingly, it is possible to reduce the difficulty of the process and to save the number of parts during the manufacturing of the laundry processing apparatus.

In addition, the laundry processing apparatus is implemented to sense the dryness level when the dryness level sensor is positioned below the center of the drum during rotation of the drum. Therefore, the dryness level of laundry can be detected more accurately.

In addition, the laundry processing apparatus is implemented to obtain the sensing result of the dryness level sensor through a short-range wireless communication method such as NFC. Therefore, a cable for communication connection between the dryness level sensor inside the drum and a controller outside the drum may be removed. Therefore, the difficulty of the process can be effectively reduced during the manufacturing of the laundry processing apparatus.

BEST MODE

Hereinafter, embodiments disclosed in the present specification will be described in detail with reference to the accompanying drawings. The accompanying drawings are only for easy understanding of the embodiments disclosed in the present specification, and the technical idea disclosed in the present specification is not limited by the accompanying drawings. It will be understood as including all modifications, equivalents, and alternatives falling within the spirit and scope of the present disclosure.

Figure 1:
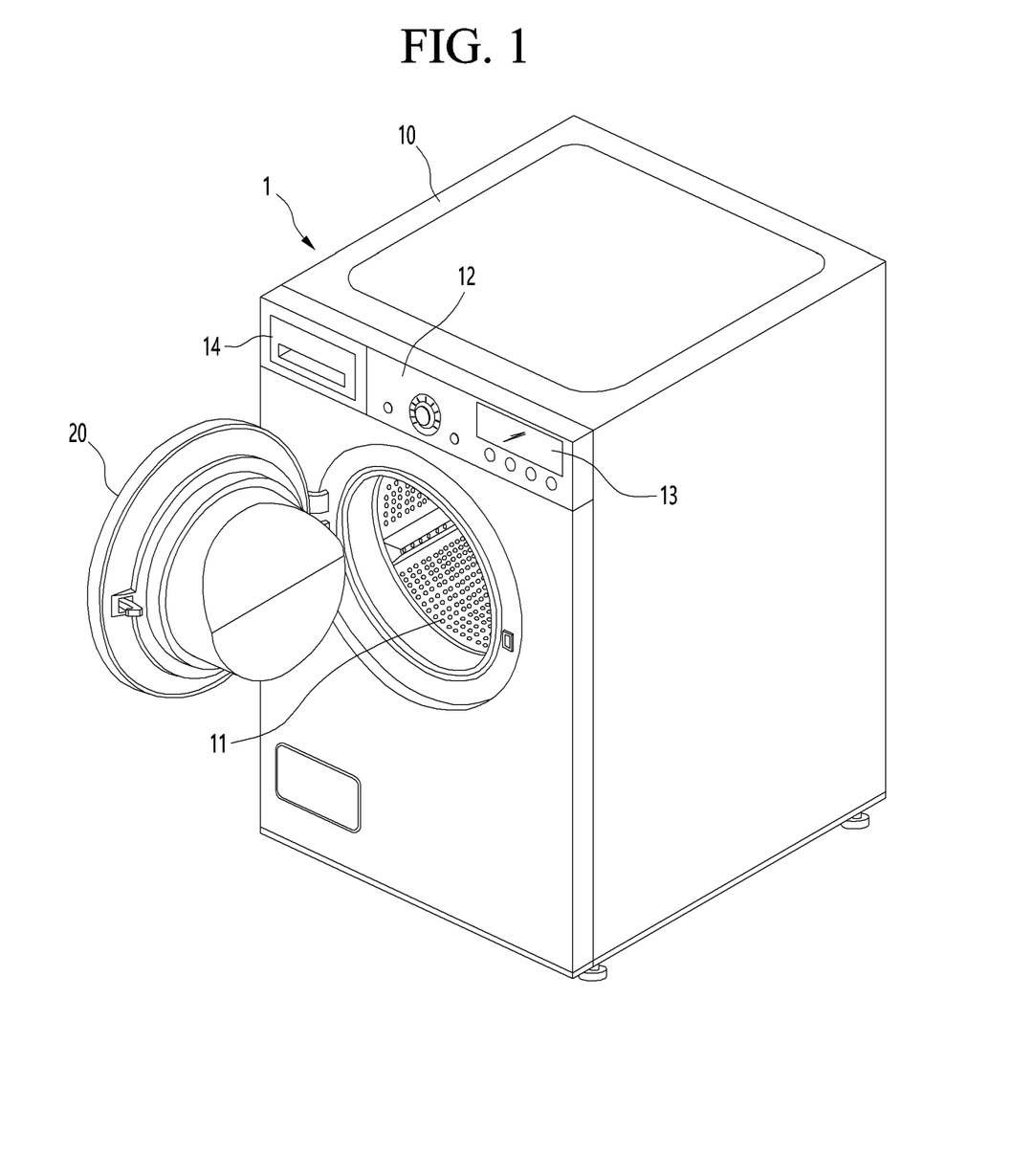
FIG. 1 is a perspective view of a laundry processing apparatus according to an embodiment of the present disclosure.
Figure 2:
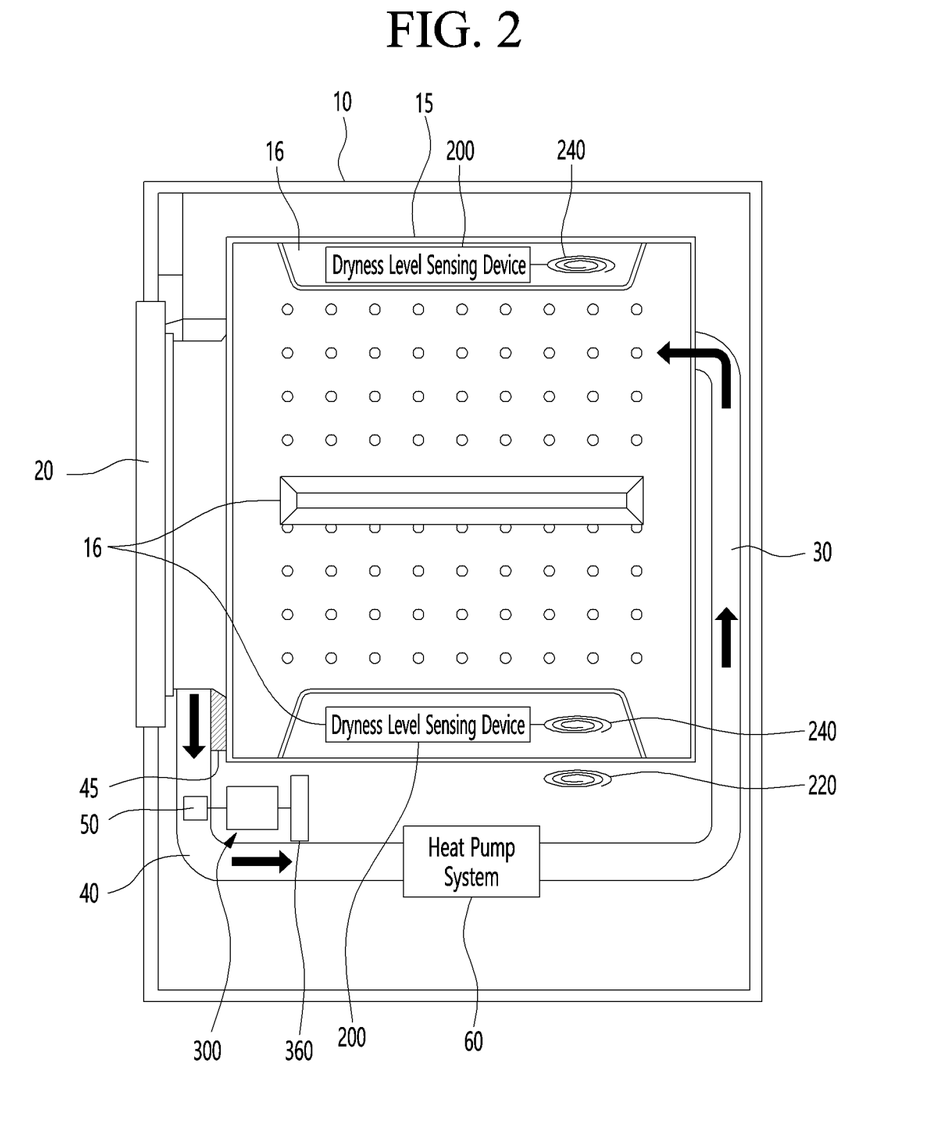
FIG. 2 is a diagram schematically illustrating the internal configuration of the laundry processing apparatus according to an embodiment of the present disclosure.

FIG. 1 is a perspective view of a laundry processing apparatus according to an embodiment of the present disclosure, and FIG. 2 is a diagram schematically illustrating the internal configuration of the laundry processing apparatus according to an embodiment of the present disclosure.

In the following drawings, a dryer 1 is described as an example of the laundry processing apparatus. However, embodiments of the present disclosure are not applied only to the dryer 1, and may also be applied to various laundry processing apparatuses such as a washing machine having a drying function.

The dryer 1 according to an embodiment of the present disclosure may form an overall appearance by a main body 10 and a door 20. In the main body 10, an inlet 11 through which clothes are put may be formed on one side, and the door may open or close the inlet 11.

A drum 15 rotatably disposed to dry clothes may be provided in the main body 10. The drum 15 may be opened toward the inlet 11 so that a user can put clothes into the drum 15 through the inlet 11.

The main body 10 may be provided with an operation interface 12 which operates the dryer 1. The operation interface 12 may be disposed above the inlet 11.

The operation interface 12 may include an operation button which selects a function provided to the dryer 1, a rotary switch, and the like. For example, a user may operate the operation button or the rotary switch provided in the operation interface 12 to turn on or off the power of the dryer 1, input a drive start or drive stop command, or set an operation mode and drying time.

The operation interface 12 may further include a display 13. The operation state of the dryer 1, the set operation mode, time information, and the like may be output on the display 13.

A drawer 14 may be provided on one side of the main body 10, and a liquid to be sprayed onto the drum may be stored in the drawer 14.

The main body 10 may be provided with a drive motor 300 which provides rotational power to the drum 15. A power transmission member 360 which rotates the drum 15 may be provided on one rotational shaft of the drive motor 300, and the drum 15 may be connected to the drive motor 300 by the power transmission member 360 and receives power. The power transmission member 360 may be a pulley or a roller.

The main body 10 may be provided with a duct defining a supply passage through which heated air is supplied to the drum 15 and an exhaust passage through which air inside the drum 15 is discharged. The duct may include a supply duct 30 defining the supply passage and an exhaust duct 40 defining the exhaust passage.

The main body 10 may be provided with an air blower fan 50 which forces the flow of air. The air blower fan 50 may communicate with the supply duct 30 and the exhaust duct 40 so that air is supplied to the inside of the drum 15 through the supply duct 30 and air inside the drum 15 is forcibly discharged through the exhaust duct 40.

The air blower fan 50 may be provided on the exhaust passage so that air discharged from the drum 15 is suctioned into the exhaust duct 40.

The air blower fan 50 may be connected to the rotational shaft of the drive motor to rotate simultaneously with the drum 15. Of course, the air blower fan 50 may be connected to a motor separate from the drive motor to rotate independently of the drum 15.

On the other hand, in the embodiment of the present disclosure, a circulation type dryer in which air inside the dryer circulates will be described as an example, but it should be noted that the present disclosure is not limited to the circulation type dryer and is also applicable to an exhaust type dryer.

When the dryer 1 is a circulation type dryer, the exhaust duct 40 may be provided to guide forcibly blown air to the supply duct 30.

On the other hand, when the dryer 1 is an exhaust type dryer, the exhaust duct 40 may be provided to guide forcibly blown air to the outside.

The supply duct 30 may extend to the rear of the drum 15, and a discharge port through which heated air is discharged to the drum may be provided at an end portion thereof.

The exhaust duct 40 may extend to the lower front of the drum 15, and a suction port through which air inside the drum is suctioned may be formed at an end portion thereof.

A heater (not shown) which heats air supplied by electric resistance heat may be further provided on the supply passage of the supply duct 30. As the heater is provided, the heating property of the supplied air may be further improved.

A filter 45 which filters out foreign matter such as lint contained in air discharged from the drum 15 may be provided on the exhaust passage of the exhaust duct 40.

On the other hand, the main body 10 may be provided with a heat pump system 60 which absorbs waste heat from the air discharged from the drum 15 and heats air to be supplied to the drum 15.

The heat pump system 60 may configure a thermodynamic cycle by including an evaporator which cools air discharged from the drum 15, a compressor which compresses a refrigerant, a condenser which heats air to be supplied to the drum 15, and an expansion valve. The evaporator, the compressor, the condenser, and the expansion valve may be sequentially connected by a pipe, and the refrigerant may circulate through the pipe.

The refrigerant may be compressed by the compressor and become a high-temperature and high-pressure gaseous state. The air becomes a high-temperature and high-pressure liquid state in the condenser, and may be heat-exchanged with low-temperature air to be supplied to the drum 15. The air may be expanded in the expansion valve and become a low-temperature and low-pressure gaseous state. The evaporator may perform heat exchange with the high-temperature and high-humidity air discharged from the drum 15.

The air supplied to the drum 15 may be heat-exchanged in the condenser and heated to a high temperature. The high-temperature and high-humidity air discharged from the drum 15 may be heat-exchanged by the evaporator, may be cooled to remove moisture, and may become a dry state. The moisture contained in the high-temperature and high-humidity air may be condensed by the evaporator and collected, and may be discharged to the outside through a drain pipe.

The evaporator may be provided on the exhaust passage of the exhaust duct 40. The condenser may be provided on the supply passage of the supply duct 30.

A machine room communicating with the exhaust duct 40 and the supply duct 30 may be formed inside the main body 10, and the compressor and the expansion valve may be provided in the machine room. The drive motor may also be provided in the machine room.

On the other hand, at least one lifter 16 may be mounted on the inner circumferential surface of the drum 15. At least one lifter 16 may function to lift the laundry to a predetermined height so that the laundry falls by gravity when the drum 15 rotates. Accordingly, agglomeration or tangle of laundry may be alleviated, and the drying of laundry may be performed more smoothly.

In addition, according to an embodiment of the present disclosure, the dryness level sensing device 200 may be provided in the at least one lifter 16. The dryness level sensing device 200 may include at least one dryness level sensor which senses the dryness level of laundry. For example, when a plurality of metal plates are provided and laundry is placed between the plurality of metal plates to form a circuit, the at least one dryness level sensor may be configured to measure the resistance value of the laundry through a change in voltage. In this case, the plurality of metal plates may be exposed into the drum 15 through one surface of the lifter 16 in order to come into direct contact with the laundry.

On the other hand, the dryer 1 may include a wireless power transmitter 220 and a wireless power receiver 240 which supply power to the dryness level sensing device 200 provided in the lifter 16. The wireless power transmitter 220 may be disposed in a space between the main body 10 and the drum 15 and may be connected to a power supply unit (not shown) in the dryer 1 through an electric wire. The wireless power receiver 240 may be disposed in the at least one lifter 16 and may be connected to the dryness level sensing device 200.

The wireless power transmitter 220 may supply power to the wireless power receiver 240 through a wireless power supply method such as a magnetic induction method or a magnetic resonance method. For example, in order to maximize the efficiency of power supplied wirelessly, the wireless power transmitter 220 and the wireless power receiver 240 may be provided at positions corresponding to each other.

Specifically, as shown in FIG. 2, the wireless power transmitter 220 may be disposed below the drum 15 in the main body 10, and the wireless power receiver 240 may be disposed in a position corresponding to the wireless power transmitter 220 in the lifter 16 in a vertical direction. In this case, the wireless power receiver 240 may also rotate according to the rotation of the drum 15. When the wireless power receiver 240 is positioned below the drum 15 during rotation, the wireless power receiver 240 may come close to the wireless power transmitter 220, thereby maximizing wireless power reception efficiency.

The wireless power receiver 240 may receive power wirelessly from the wireless power transmitter 220, and may supply power based on the supplied power to the dryness level sensing device 200. The dryness level sensing device 200 may perform a dryness level sensing operation based on the supplied power.

The dryness level sensing device 200 will be described in more detail later with reference to FIGS. 3 to 8.

FIG. 2 shows that the dryness level sensing device 200 and the wireless power receiver 240 are provided in the at least one lifter 16, but according to an embodiment, the dryer 1 may include the dryness level sensing device 200 and the wireless power receiver 240 in only one of the at least one lifter 16.

Hereinafter, a control configuration of a laundry processing apparatus according to an embodiment of the present disclosure will be described with reference to FIG. 3.

Figure 3:
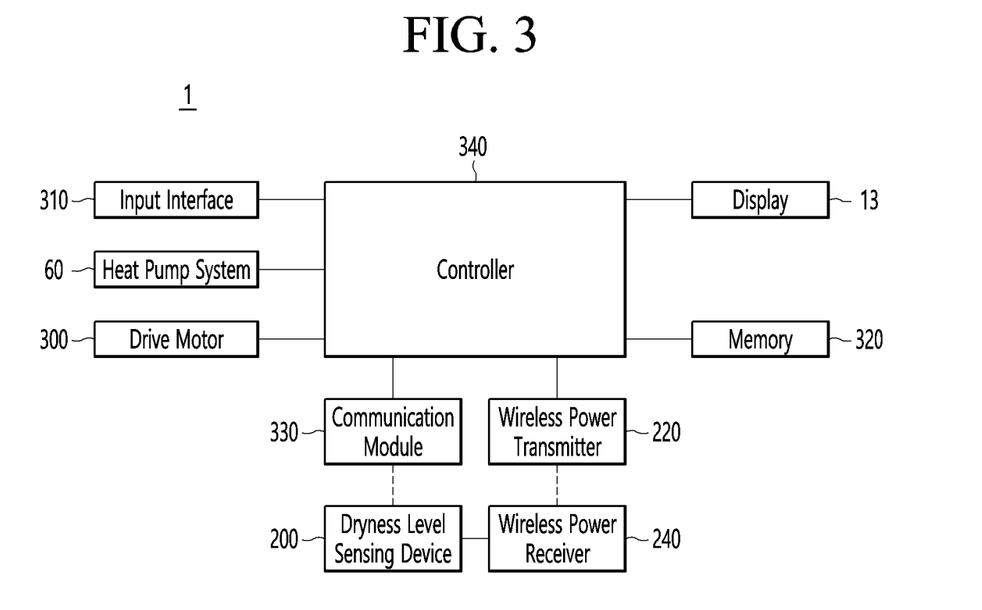
FIG. 3 is a schematic block diagram of a control configuration of the laundry processing apparatus according to an embodiment of the present disclosure.

FIG. 3 is a schematic block diagram of a control configuration of a laundry processing apparatus according to an embodiment of the present disclosure.

Referring to FIG. 3, the laundry processing apparatus (dryer 1) may include an input interface 310 corresponding to the operation interface 12 described above with reference to FIG. 1. The input interface 310 may include an operation button which selects a function provided to the dryer 1, a rotary switch, and the like. A user may use the input interface 310 to turn on/off the power of the dryer 1, input a drive start or drive stop command, or set a driving mode and drying time.

The display 13 may output the operation state of the dryer 1, the set operation mode, time information, and the like. According to an embodiment, the display 13 may be implemented as a touch screen including a touch panel, and the touch screen may function as the input interface 310.

The dryer 1 may include a memory 320 which stores information such as algorithm data and set value data related to the operation of the dryer 1. In addition, the memory 320 according to an embodiment of the present disclosure may store data related to the control of the wireless power transmitter 220. In addition, the memory 320 may store algorithm data for measuring the dryness level of laundry from the sensing result received from the dryness level sensing device 200.

In addition, the dryer 1 may include a communication module 330 which communicates with an external terminal or server, or the dryness level sensing device 200 inside the drum 15. The communication module 330 may include at least one communication module. For example, the communication module 330 may include a Bluetooth communication module and/or a Wi-Fi communication module which connects to a terminal and/or a server. In addition, the communication module 330 may include a near field communication (NFC) reader. The controller 340 may receive the sensing result from the dryness level sensing device 200 through the NFC reader.

On the other hand, the dryer 1 may include a controller 340 which controls the overall operation of the dryer 1. The controller 340 may include at least one processor or controller. Each of the at least one processor or controller may be implemented as a CPU, a microcomputer, an application processor (AP), an integrated circuit, an application specific integrated circuit (ASIC), or the like.

When an operation signal is received through the input interface 310, the controller 340 may check information corresponding to the operation signal received from the memory 320. The operations of the drive motor 300 and the heat pump system 60 may be controlled according to the information stored in the memory 320. For example, when a drying start command is input through the input interface 310, the controller 340 may start drying by driving the drive motor 300 and the compressor of the heat pump system 60. When a drying end command is input, the drive motor 300 and the compressor may be stopped to end drying.

In addition, the controller 340 may control the wireless power transmitter 220 to supply power to the wireless power receiver 240 provided in the lifter 16. The wireless power transmitter 220 and the wireless power receiver 240 may wirelessly transmit and receive power by a magnetic induction method or a magnetic resonance method. The wireless power receiver 240 may supply the dryness level sensing device 200 with driving power based on the received power.

According to an embodiment, the controller 340 may control the wireless power transmitter 220 to supply power when the wireless power receiver 240 is in proximity to the wireless power transmitter 220 while the drum 15 is rotating. The proximity state may refer to a state in which the wireless power receiver 240 reaches a preset position while the drum 15 is rotating. For example, the memory 320 may store the rotation state (rotational speed, etc.) of the drum 15 according to the driving of the drive motor 300, and an algorithm which calculates the positions of the lifter 16 and the wireless power receiver 240 accordingly. The controller 340 may calculate the positions of the lifter 16 and the wireless power receiver 240 based on the algorithm, and may control the wireless power transmitter 220 to supply power when the calculated position is a position (preset position) close to the wireless power transmitter 220.

Alternatively, the controller 340 may calculates a period in which the wireless power receiver 240 approaches the wireless power transmitter 220 based on the rotational speed of the drive motor 300 or the drum 15, and may control the wireless power transmitter 220 to supply power based on the period.

Alternatively, the controller 340 may control the wireless power transmitter 220 to supply power for a predetermined time every specific period during the drying cycle or to supply power for a predetermined time at every specific cycle after the drying cycle has been performed for a predetermined time.

On the other hand, the controller 340 may receive the sensing result from the dryness level sensing device 200 through the communication module 330 and measure the dryness level based on the received sensing result.

For example, the controller 340 may control the driving of the drive motor 300 and the compressor based on the measured dryness level or the change in the measured dryness level. For example, when the change in the measured dryness level is equal to or less than a reference value, the controller 340 may increase the rotational speed of the drive motor 300 or increase the rotation speed of the motor in the compressor.

According to an embodiment, when the measured dryness level is equal to or greater than a reference dryness level, the controller 340 may stop the drive motor 300 and the compressor to complete the drying cycle.

Hereinafter, the dryness level sensing device 200, the wireless power transmitter 220, and the wireless power receiver 240 included in the laundry processing apparatus according to the embodiment of the present disclosure will be described in detail with reference to FIGS. 4 to 6.

Figure 4:
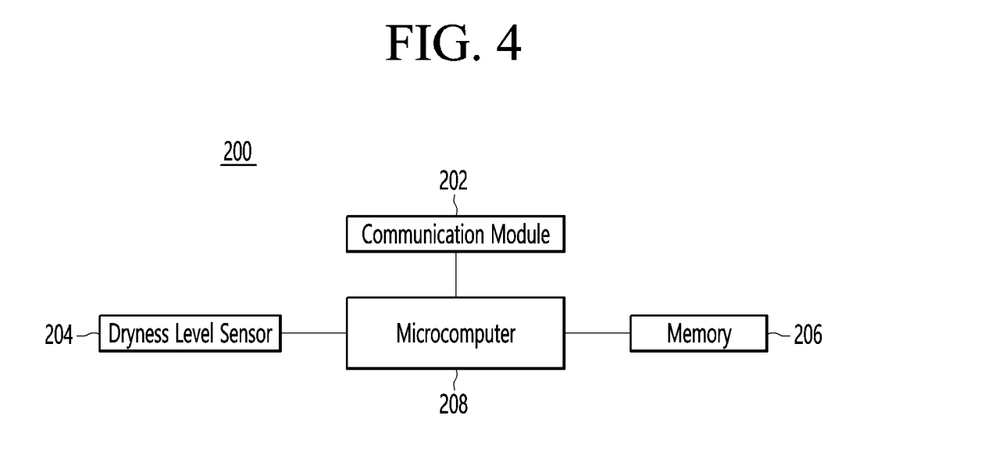
FIG. 4 is a schematic block diagram of a configuration of a dryness level sensing device illustrated in FIG. 3.

FIG. 4 is a schematic block diagram of the configuration of the dryness level sensing device illustrated in FIG. 3.

Referring to FIG. 4, the dryness level sensing device 200 may include a communication module 202, a dryness level sensor 204, a memory 206, and a microcomputer 208.

The communication module 202 may transmit the sensing result obtained by the dryness level sensor 204 to the controller 340 of the dryer 1. For example, the communication module 202 may include an NFC transmitter which outputs the sensing result according to an NFC communication method, or a communication module which supports other short-range wireless communication methods.

The dryness level sensor 204 may be configured to sense the dryness level of laundry during the drying cycle. As described above, when the dryness level sensor 204 includes a plurality of metal plates and laundry is placed between the plurality of metal plates to form a circuit, the dryness level sensor 204 may measure the resistance value of the laundry through a change in voltage.

The microcomputer 208 may transmit the sensing result including the measured resistance value to the controller 340 through the communication module 202.

According to an embodiment, the microcomputer 208 may receive a sensing command from the controller 340 through the communication module 202 and obtain a sensing result through the dryness level sensor 204 based on the received sensing command.

The memory 206 may store various control data or algorithms related to the operation of the dryness level sensing device 200. In particular, the memory 206 may store an algorithm which measures the resistance value of the laundry based on the change in voltage sensed by the dryness level sensor 204.

According to an embodiment, the algorithm which measures the resistance value of the laundry based on the change in the voltage may be stored in the memory 320 described above with reference to FIG. 3. In this case, the microcomputer 208 may transmit, to the controller 340, the sensing result including information about the change in the voltage sensed by the dryness level sensor 204. The controller 340 may measure the resistance value of the laundry based on the sensing result and the algorithm stored in the memory 320, and may calculate the dryness level of the laundry based on the measured resistance value.

Figure 5:
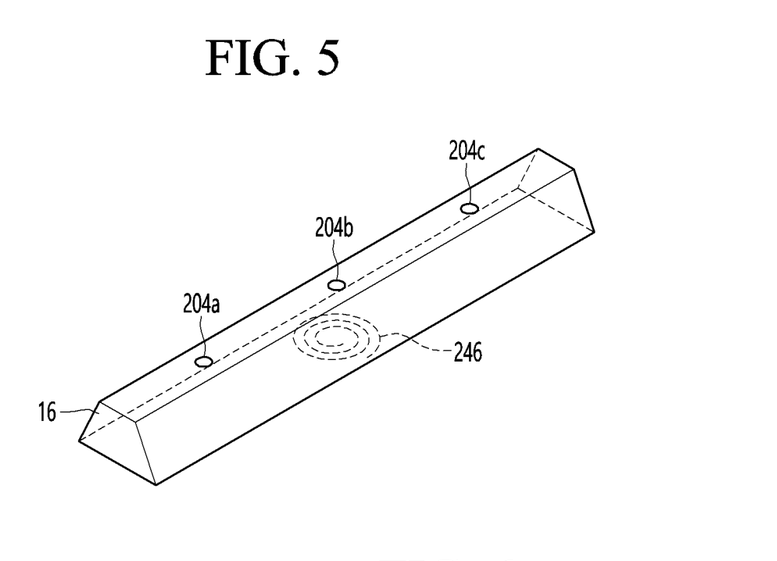
FIG. 5 is a diagram schematically illustrating an example of a dryness level sensor and a wireless power receiver disposed on a lifter of the laundry processing apparatus.

FIG. 5 is a diagram schematically illustrating an example of the dryness level sensor and the wireless power receiver disposed on the lifter of the laundry processing apparatus.

Referring to FIG. 5, the dryness level sensing device 200 may include at least one dryness level sensor. Although FIG. 5 shows that the dryness level sensing device 200 includes three dryness level sensors 204a, 204b, and 204c, the number of dryness level sensors may be freely changed.

Each of the dryness level sensors 204a to 204c may be disposed such that at least a portion thereof is exposed through one surface of the lifter 16 (for example, the surface facing the inner center of the drum 15). In addition, the dryness level sensors 204a to 204c may be disposed to be spaced apart from each other, and may effectively sense the dryness level of laundry existing in various areas within the drum 15.

On the other hand, the wireless power receiver 240 may include a receiver 246 which receives power from the wireless power transmitter 220. The receiver 246 may be implemented in the form of a coil, but the present disclosure is not necessarily limited thereto. The receiver 246 may have a different form according to a wireless power transmission method.

For example, when the wireless power transmitter 220 and the wireless power receiver 240 transmit and receive power according to a magnetic induction method, the receiver 246 may receive power by forming an induced current based on an electromagnetic field formed by the transmitter (see 228 of FIG. 6) of the wireless power transmitter 220.

The receiver 246 may be disposed in an area adjacent to the inner surface of the drum 15 among areas within the lifter 16 in order to be close to the wireless power transmitter 220 disposed outside the drum 15.

Figure 6:
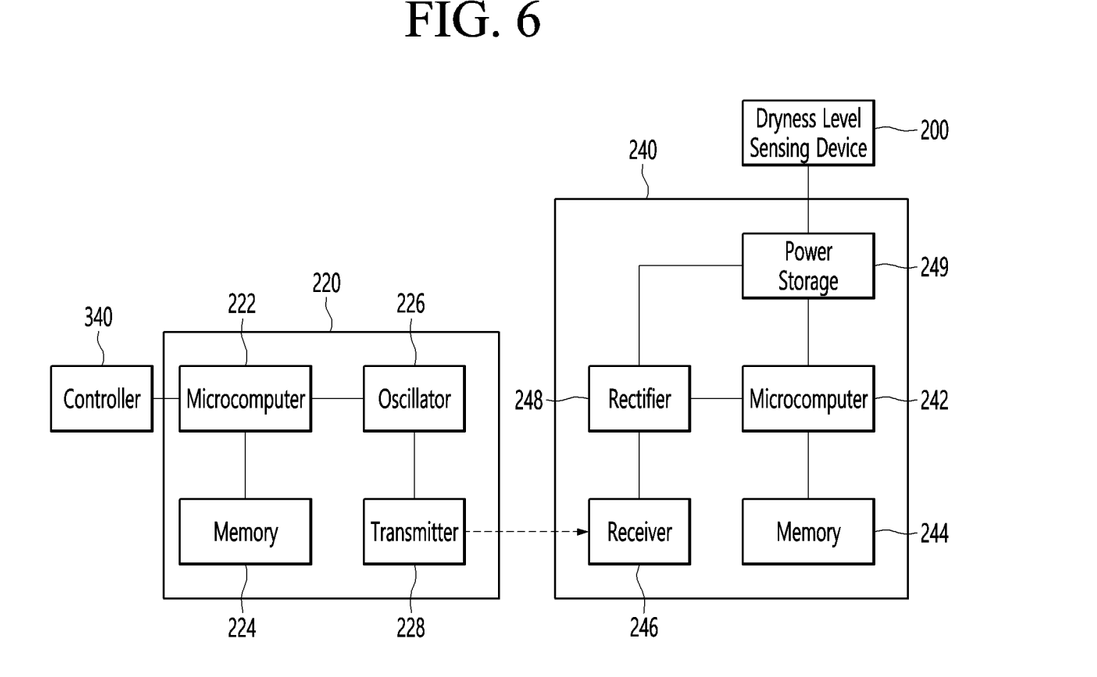
FIG. 6 is a schematic block diagram of a configuration of a wireless power transmitter and a wireless power receiver illustrated in FIG. 3.

FIG. 6 is a schematic block diagram of the configuration of the wireless power transmitter and the wireless power receiver illustrated in FIG. 3.

The wireless power transmitter 220 and the wireless power receiver 240 may wirelessly transmit and receive power according to various wireless power transmission methods such as a magnetic induction method or a magnetic resonance method.

The magnetic induction method uses an electromagnetic induction phenomenon in which a voltage is induced and a current flows when a magnetic field is changed around a conductor through which electricity flows.

According to the magnetic resonance method, when the transmitter and the receiver resonate at the same frequency, power may be transmitted according to wireless power transmission in which electromagnetic waves move from the transmitter to the receiver through an electromagnetic field. A transmitting coil of the transmitter may have a predetermined resonant frequency, and may generate an electromagnetic wave and a magnetic field as power is supplied. At this time, induced power may be generated in a receiving coil of the receiver by the magnetic field.

That is, in the present specification, the transmission of power from the wireless power transmitter 220 to the wireless power receiver 240 means that the receiver 246 of the wireless power receiver 240 generates induced power by the magnetic field generated by the transmitter 228 of the wireless power transmitter 220.

Referring to FIG. 6, the wireless power transmitter 220 may include a microcomputer 222, a memory 224, an oscillator 226, and a transmitter 228. As described above, the wireless power transmitter 220 may be disposed outside the drum 15, for example, below the drum 15 in the main body 10.

The microcomputer 222 may control the overall operation of the wireless power transmitter 220. For example, the microcomputer 222 may receive a control command for transmitting power from the controller 340, and control the oscillator 226 according to the received control command, so that power can be transmitted to the wireless power receiver 240.

The memory 224 may store control data related to operations of elements included in the wireless power transmitter 220.

The oscillator 226 may provide AC power to the transmitter 228 under the control of the microcomputer 222. For example, the oscillator 226 may maximize the efficiency of power supply by controlling the frequency of the power provided to the transmitter 228 as a resonant frequency.

The transmitter 228 may supply power to the wireless power receiver 240 based on the AC power provided by the oscillator 226. For example, the transmitter 228 may include a transmitting coil which generates a magnetic field when the AC power is provided, but the present disclosure is not limited thereto.

On the other hand, the wireless power transmitter 220 may include only the oscillator 226 and the transmitter 228. In this case, the overall operation of the wireless power transmitter 220 may be controlled by the controller 340. In addition, control data related to the operation of the wireless power transmitter 220 may be stored in the memory 320.

The wireless power receiver 240 may include a microcomputer 242, a memory 244, a receiver 246, and a rectifier 248. As described above, the wireless power receiver 240 may be disposed inside the lifter 16 provided in the drum 15.

The microcomputer 242 may control the overall operation of the wireless power receiver 240. For example, when AC power corresponding to power received through the receiver 246 is rectified by the rectifier 248, the microcomputer 242 may perform control to supply the rectified power to the dryness level sensing device 200.

The memory 244 may store control data related to operations of elements included in the wireless power receiver 240.

The receiver 246 may receive power from the transmitter 228. For example, the receiver 246 may include a receiving coil which generates induced power based on a magnetic field generated by the transmitter 228, but the present disclosure is not limited thereto.

The rectifier 248 may rectify AC power corresponding to the induced power generated from the receiver 246. Power rectified by the rectifier 248 may be provided to the microcomputer 242 and the dryness level sensing device 200.

According to an embodiment, the wireless power receiver 240 may further include a power storage 249 which stores power supplied through the receiver 246. For example, the power storage 249 may include a capacitor or a battery. In this case, the microcomputer 242 may control charging and discharging of the power storage 249, or may provide the dryness level sensing device 200 with power based on the power stored in the power storage 249.

On the other hand, the wireless power receiver 240 may include only the receiver 246 and the rectifier 248, or may include only the receiver 246, the rectifier 248, and the power storage 249. In this case, the power supplied through the receiver 246 may be rectified by the rectifier 248 and then directly provided to the dryness level sensing device 200 or stored in the power storage 249.

That is, the laundry processing apparatus according to an embodiment of the present disclosure includes the wireless power transmitter 220 and the wireless power receiver 240, such that power is wirelessly supplied to the dryness level sensing device 200 disposed in the lifter 16 of the drum 15. Accordingly, the configuration for supplying power from the outside to the inside of the drum 15 may be simplified, and thus the difficulty of the manufacturing process may also be effectively lowered.

Figure 7:
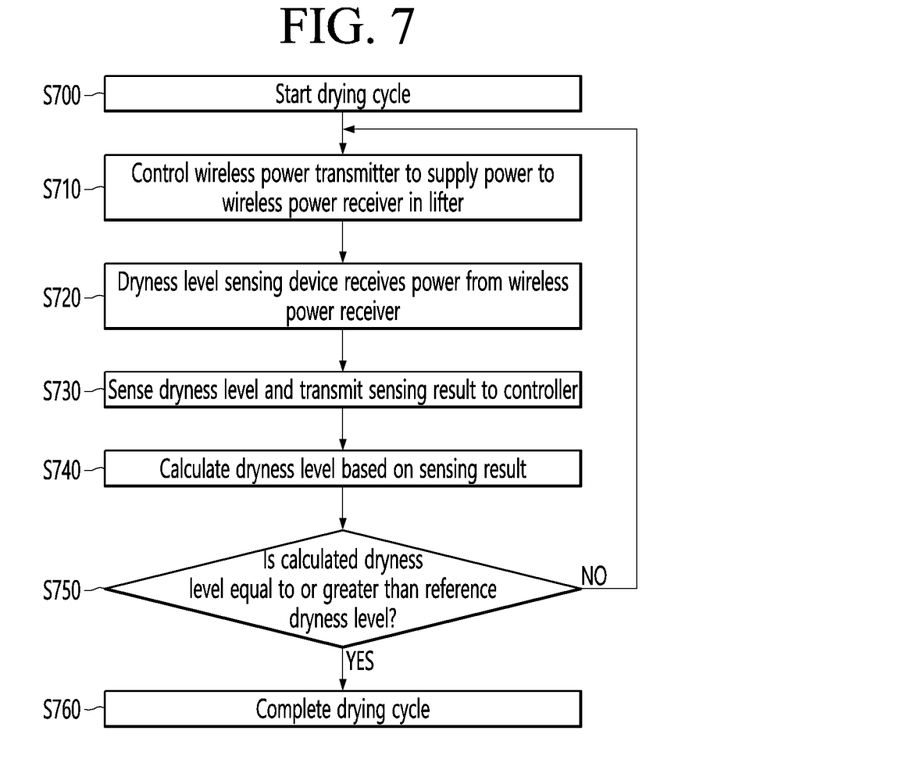
FIG. 7 is a flowchart for explaining the operation of the laundry processing apparatus according to an embodiment of the present disclosure.

FIG. 7 is a flowchart for explaining the operation of the laundry processing apparatus according to an embodiment of the present disclosure.

Referring to FIG. 7, the laundry processing apparatus (dryer 1) may start a drying cycle based on a drying start command received through the input interface 310 or the like (S700).

The controller 340 may receive the drying start command through the input interface 310 or the like. The drying start command may include information such as a drying mode and a drying time.

In response to the received drying start command, the controller 340 may control the drive motor 300 and the heat pump system 60 to start the drying cycle.

The dryer 1 may control the wireless power transmitter 220 to supply power to the wireless power receiver 240 in the lifter 16 (S710).

When the drying cycle is started, the controller 340 may calculate the dryness level of the laundry using the dryness level sensing device 200.

The dryness level sensing device 200 may be connected to the wireless power receiver 240 and may not operate before receiving power from the wireless power receiver 240.

Accordingly, the controller 340 may control the wireless power transmitter 220 to supply power to the wireless power receiver 240 in order to operate the dryness level sensing device 200.

According to an embodiment, since there is a high probability that the laundry will not be completely dried in the initial section of the drying cycle, it may be unnecessary to operate the dryness level sensing device 200 in the initial section in terms of power consumption and the like. Therefore, the controller 340 may control the wireless power transmitter 220 to supply power to the wireless power receiver 240 after the drying cycle has been performed for a predetermined time.

According to an embodiment, the power transmission efficiency according to the wireless power transmission method may increase as the distance between the wireless power transmitter 220 and the wireless power receiver 240 decreases. Therefore, the controller 340 may supply power to the wireless power receiver 240 by controlling the wireless power transmitter 220 while the lifter 16 including the wireless power receiver 240 exists in a section within a predetermined distance from the wireless power transmitter 220 during the rotation of the drum 15.

To this end, the controller 340 may calculate the position of the lifter 16 based on rotation information (rotational speed, reference position, etc.) of the drive motor 300, or may calculate the position of the lifter 16 using a sensor (not shown) separately provided to sense the position of the lifter 16. When the calculated position corresponds to a preset position, the controller 340 may control the wireless power transmitter 220 to supply power to the wireless power receiver 240.

As described above with reference to FIG. 6, the wireless power transmitter 220 may provide AC power to the transmitter 228 under the control of the controller 340.

As the AC power is applied to the transmitter 228, a magnetic field may be generated from the transmitter 228. The receiver 246 of the wireless power receiver 240 may receive power by generating induced power based on the magnetic field.

The dryness level sensing device 200 disposed in the lifter 16 may receive power from the wireless power receiver 240 (S720). The dryness level sensing device 200 may obtain the sensing result related to the dryness level of laundry based on the received power, and transmit the obtained sensing result to the controller 340 (S730).

When the power is supplied from the wireless power transmitter 220 in operation S710, the wireless power receiver 240 may supply at least a portion of the supplied power to the dryness level sensing device 200.

The microcomputer 208 of the dryness level sensing device 200 may be activated based on the supplied power. The activated microcomputer 208 may obtain the sensing result related to the drying level of laundry through the dryness level sensor 204, and transmit the obtained sensing result to the controller 340 through the communication module 202.

As described above, when the dryness level sensor 204 includes a plurality of metal plates and laundry is placed between the plurality of metal plates to form a circuit, the dryness level sensor 204 may sense the change in voltage. The dryness level sensing device 200 may measure a resistance value based on the change in voltage, and transmit the measured resistance value to the controller 340 as the sensing result.

Alternatively, the dryness level sensing device 200 may transmit the change in voltage to the controller 340 as the sensing result.

For example, the communication module 202 of the dryness level sensing device 200 may include an NFC transmitter which transmits the sensing result through an NFC communication method. On the other hand, the communication module 330 connected to the controller 340 may include an NFC reader disposed in an area adjacent to the drum 15 in the main body 10. The NFC reader may receive the sensing result from the NFC transmitter when the dryness level sensing device 200 provided in the lifter 16 is close as the drum 15 rotates.

The controller 340 of the dryer 1 may calculate the dryness level of laundry based on the sensing result received from the dryness level sensing device 200 (S740).

The memory 320 may store an algorithm or data for calculating the dryness level of laundry based on the sensing result. The controller 340 may calculate the dryness level based on the sensing result by using the algorithm or data stored in the memory 320.

When the calculated dryness level is equal to or greater than the reference dryness level (YES in S750), the dryer 1 may detect that the laundry has been dried and complete the drying cycle (S760).

When the calculated dryness level is equal to or greater than the reference dryness level, the controller 340 may complete the drying cycle by stopping the driving of the drive motor 300 and the heat pump system 60.

According to an embodiment, the controller 340 may output a notification of completion of the drying cycle through an output means such as a display 13 or a sound output interface (not shown), or may transmit a drying cycle completion message to a user's terminal or the like through the communication module 330.

On the other hand, when the calculated dryness level is less than the reference dryness level (NO in S750), the dryer 1 may re-perform operations S710 to S740.

For example, the dryer 1 may supply power to the dryness level sensing device 200 by controlling the wireless power transmitter 220 at each preset period in order to calculate the dryness level at each preset period.

According to an embodiment, the cycle may be adjusted according to the calculated dryness level. For example, as the calculated dryness becomes closer to the reference dryness, the period may be shortened.

According to an embodiment, the dryer 1 may control the driving of the drive motor 300 and the heat pump system 60 based on the calculated dryness level.

Figure 8:
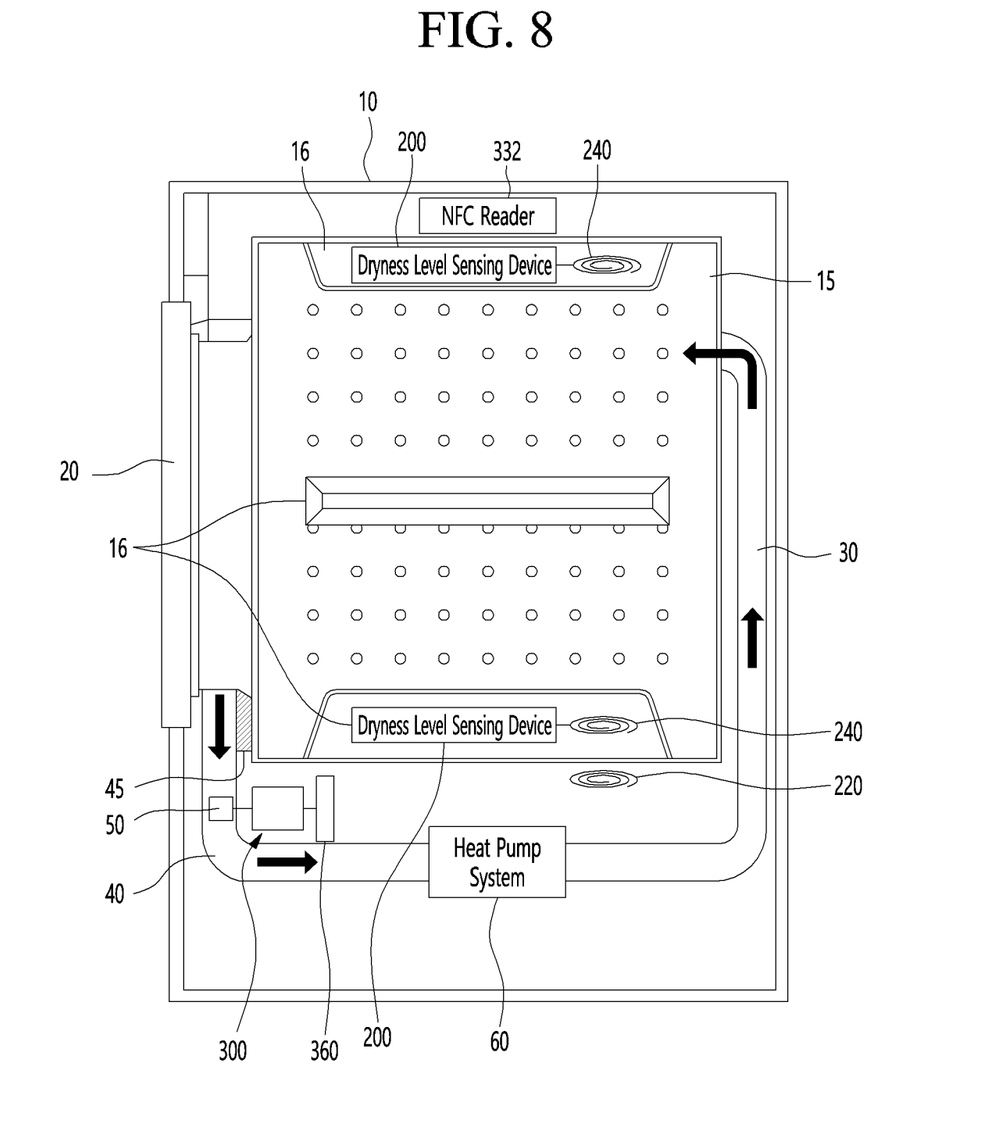
FIG. 8 is an exemplary diagram for a detailed description related to the operation of the laundry processing apparatus illustrated in FIG. 7.

FIG. 8 is an exemplary diagram for a detailed description related to the operation of the laundry processing apparatus shown in FIG. 7.

Referring to FIG. 8, the wireless power transmitter 220 may be disposed below the drum 15 in the main body 10. In this case, when the dryness level sensing device 200 is positioned below the center of the drum 15, power may be more smoothly supplied, and a sensing operation may be performed using the supplied power. That is, since the dryness level sensing device 200 can more easily contact the laundry when located below the upper portion of the drum 15, it may be appropriate that the wireless power transmitter 220 is disposed below the drum 15.

On the other hand, the NFC reader 332 of the communication module 330 may be disposed on the upper portion of the drum 15 in the inside of the main body 10, but the present disclosure is not necessarily limited thereto.

As the drying cycle of the dryer 1 is started, the drum 15 may rotate. As the drum 15 rotates, the position of the lifter 16 provided on the inner surface of the drum 15 may reciprocate while rotating between the lower portion and the upper portion of the drum 15.

When the lifter 16 is positioned below the drum 15, the wireless power receiver 240 included in the lifter 16 may receive power from the wireless power transmitter 220, and may provide at least a portion of the supplied power to the dryness level sensing device 200. The dryness level sensing device 200 may obtain the sensing result through the dryness level sensor 204 based on the provided power.

When the lifter 16 is positioned on the drum 15 according to the rotation of the drum 15, the NFC reader 332 may receive the sensing result from the NFC transmitter included in the communication module 202 of the dryness level sensing device 200.

The controller 340 connected to the NFC reader 332 may calculate the dryness level based on the received sensing result, may complete the drying cycle based on the calculated dryness level, or may control the driving of the drive motor 300 and/or the heat pump system 60.

That is, according to an embodiment of the present disclosure, in the laundry processing apparatus, the dryness level sensing device 200 and the wireless power receiver 240 connected thereto may be disposed in the lifter 16, and the wireless power transmitter 220 may be disposed at a position corresponding to the wireless power receiver 240. Since the dryness level sensing device 200 can operate by receiving power according to a wireless power transmission method, a configuration of a cable or electric wire for supplying power between the inside and the outside of the drum 15 is unnecessary. Accordingly, it is possible to reduce the difficulty of the process and to save the number of parts during the manufacturing of the laundry processing apparatus.

The laundry processing apparatus is implemented to sense the dryness level when the dryness level sensor 204 is positioned below the center of the drum 15 during rotation of the drum 15. Therefore, the dryness level of laundry can be detected more accurately.

In addition, the laundry processing apparatus is implemented to obtain the sensing result of the dryness level sensor through a short-range wireless communication method such as NFC. Therefore, a cable for communication connection between the dryness level sensor 204 inside the drum 15 and the controller 340 outside the drum 15 may be removed. Therefore, the difficulty of the process can be effectively reduced during the manufacturing of the laundry processing apparatus.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A laundry apparatus comprising:
   a drum rotatably disposed in a main body;
   a motor configured to drive the drum such that the drum is to rotate;
   a lifter disposed at an inner surface of the drum;
   a dryness sensing device provided at the lifter;
   a wireless receiver provided inside the lifter and electrically connected to the dryness sensing device;
   a wireless transmitter disposed between the main body and the drum to wirelessly provide power to the wireless receiver; and
   a controller configured to receive a sensing result from the dryness sensing device and to determine a dryness value based on the received sensing result,
   wherein the wireless transmitter is disposed below the drum to provide power to the wireless receiver provided inside the lifter located at a bottom during a rotation of the drum.

2. The laundry apparatus of claim 1, wherein the wireless receiver includes a receiving coil, and
   wherein the wireless transmitter includes a transmitting coil.

3. The laundry apparatus of claim 2, wherein the transmitting coil is disposed below the drum in the main body.

4. The laundry apparatus of claim 3, wherein the controller is configured to:
   control the driving by the motor during a drying cycle,
   determine a position of the lifter based on a rotation of the drum, and
   when the determined position of the lifter corresponds to a lower portion of the drum, control the wireless transmitter to provide power to the wireless receiver.

5. The laundry apparatus of claim 3, wherein the controller is configured to:
   control the driving by the motor during a drying cycle,
   determine a proximity period of the receiving coil and the transmitting coil based on rotation of the drum, and
   control the wireless transmitter to provide power to the wireless receiver based on the determined proximity period,
   wherein the receiving coil includes a first receiving coil and a second receiving coil disposed adjacent to the first receiving coil,
   wherein the proximity period is the time taken by the drum to rotate a first position where a distance between the first receiving coil and the transmitting coil in minimum to a second position where a distance between the second receiving coil and the transmitting coil in minimum.

6. The laundry apparatus of claim 2, wherein the controller is configured to control the wireless transmitter to provide power to the wireless receiver when a preset time has elapsed from start of a drying cycle.

7. The laundry apparatus of claim 1, wherein the dryness sensing device is configured to:
   obtain the sensing result based on power received from the wireless receiver, and
   provide the sensing result by a near field communication (NFC) transmitter, and
   wherein the controller is configured to receive the sensing result through an NFC reader.

8. The laundry apparatus of claim 1, wherein the controller is configured to:
   detect completion of a drying cycle and stop the driving by the motor when the dryness value is determined to be equal to or greater than a reference dryness value.

9. The laundry apparatus of claim 1, wherein the controller is configured to:
   control the driving by the motor when the dryness value is determined to be less than a reference dryness value.

10. The laundry apparatus of claim 1, wherein the controller is configured to:
    control the wireless transmitter to provide power to the wireless receiver at least during a predetermined period, and
    when the dryness value is determined to be less than a reference dryness value, change the predetermined period based on the determined dryness value.

11. The laundry apparatus of claim 10, wherein the controller is configured to decrease the predetermined period when the dryness value is closer to the reference dryness value.

12. The laundry apparatus of claim 1, wherein the dryness sensing device includes:
    at least one sensor;
    a communication device to communicate the sensing result; and
    a controlling device configured to control the at least one sensor.

13. The laundry apparatus of claim 12, wherein each of the at least one sensor is disposed to be spaced apart from each other and to be exposed through one surface of the lifter.

14. A laundry apparatus comprising:
    a drum disposed in a body;
    a motor configured to rotate the drum;
    a lifter disposed at an inner surface of the drum;
    a sensing device provided at the lifter to sense information within the drum;
    a receiver provided inside the lifter;
    a transmitter disposed between the body and the drum to wireless provide power to the receiver; and
    a controller configured to receive a sensing result from the sensing device and to control the motor based on the received sensing result,
    wherein the transmitter is disposed below the drum to provide power to the receiver provided inside the lifter located at a bottom during a rotation of the drum.

15. The laundry apparatus of claim 14, wherein the controller is configured to:
    control the motor during a drying cycle,
    determine a position of the lifter based on rotation of the drum, and when the determined position of the lifter corresponds to a lower portion of the drum, control the transmitter to wirelessly provide power to the receiver.

16. The laundry apparatus of claim 14, wherein the controller is configured to:

control the motor during a drying cycle, determine a proximity period of the receiver and the transmitter based on rotation of the drum, and control the transmitter to provide power to the receiver based on the determined proximity period, wherein the receiver includes a first receiving coil and a second receiving coil disposed adjacent to the first receiving coil, wherein the proximity period is time taken by the drum to rotate a first position where a distance between the first receiving coil and the transmitter in minimum to a second position where a distance between the second receiving coil and the transmitter in minimum.

17. The laundry apparatus of claim 14, wherein the sensing device includes:

at least two sensors being exposed at a surface of the lifter; and a communication device to communicate information regarding the at least two sensors.

18. A laundry apparatus comprising:

a drum disposed in a body;

a motor configured to rotate the drum;

a lifter disposed in the drum;

at least one sensor exposed at a surface of the lifter to sense information within the drum;

a receiver provided inside the lifter to wirelessly receive power from outside the drum;

a transmitter disposed outside the drum to wireless provide power to the receiver; and a controller configured to receive information relating to the sensed information and to control the motor based on the received information, wherein the transmitter is disposed below the drum to provide power to the receiver provided inside the lifter located at a bottom during a rotation of the drum.

* * * * *